United States Patent [19]

Murabe et al.

[11] Patent Number: 5,628,567
[45] Date of Patent: May 13, 1997

[54] DYNAMIC PRESSURE GAS BEARING STRUCTURE

[75] Inventors: Kaoru Murabe; Osamu Komura, both of Hyogo, Japan

[73] Assignee: Sumitomo Electric Industries, Ltd., Osaka, Japan

[21] Appl. No.: 613,282

[22] Filed: Mar. 11, 1996

[30] Foreign Application Priority Data

Mar. 13, 1995 [JP] Japan ................................. 7-053007
Feb. 27, 1996 [JP] Japan ................................. 8-039623

[51] Int. Cl.$^6$ .................................................. F16C 32/06
[52] U.S. Cl. ........................... 384/100; 384/114; 384/115; 384/118
[58] Field of Search .................................. 384/100, 107, 384/114, 115, 118, 120

[56] References Cited

U.S. PATENT DOCUMENTS

| | | |
|---|---|---|
| 2,879,111 | 3/1959 | Heinrich et al. .............. 384/118 X |
| 3,132,906 | 5/1964 | Sternlicht ...................... 384/114 |
| 3,433,542 | 3/1969 | Tonooka et al. . | |
| 4,624,584 | 11/1986 | Odermatt .................... 384/100 X |
| 4,834,559 | 5/1989 | Kalvoda ........................ 394/118 |
| 5,028,148 | 7/1991 | Kanamaru et al. . | |
| 5,129,738 | 7/1992 | Nakagawa . | |
| 5,271,677 | 12/1993 | Sherman et al. .............. 384/100 X |

FOREIGN PATENT DOCUMENTS

| | | |
|---|---|---|
| 0297022 | 12/1988 | European Pat. Off. . |
| 1-7849 | 3/1989 | Japan . |
| 282484 | 8/1952 | Switzerland . |

OTHER PUBLICATIONS

ShinichiTohgo et al. "Gas Bearing" 1984, pp. 12–15.
Atsunobu Mori, "About Whirling of Gas Bearing" Junkatsu, vol. 20, No. 7, 1975, pp. 481–488.

*Primary Examiner*—Thomas R. Hannon
*Attorney, Agent, or Firm*—W. G. Fasse; W. F. Fasse

[57] ABSTRACT

Provided is a dynamic pressure gas bearing structure which is applicable to a high-speed rotation driving part such as a hard disk driver or the like and has high rotational accuracy in high-speed rotation. The dynamic pressure gas bearing structure comprises a shaft body and a bearing body. When the shaft body and the bearing body are so arranged that central axes thereof are aligned with each other, a substantially cylindrical gap is defined between the outer peripheral surface of the shaft body and the inner peripheral surface of the bearing body. The gap has at least one gap change portion whose thickness is changed with respect to a central angle corresponding to the circumference along the outer peripheral surface of the shaft body. The gap change rate $\alpha$ is at least $1.0 \times 10^{-4}/°$ and less than $10.0 \times 10^{-4}/°$.

9 Claims, 8 Drawing Sheets

$D_2 - D_1 = 2h_0$ r : RADIUS OF SHAFT BODY
Cl : DIAMETER DIFFERENCE (=2h₀)
h(θ) : GAP FUNCTION
g(θ) : FORM FUNCTION

WHERE
$h(\theta) = Cl/2 + g(\theta)$
$\quad\quad = h_0 + g(\theta)$ $h_0 = 0.000625 D_1$
$d = (h_{max} - h_0) D_1$
$\quad = 0.00125 D_1$
$W = 60°$ $\alpha = 3.0 \times 10^{-4}/\text{deg}$ $\alpha = 3.0 \times 10^{-4}/\text{deg}$ $\alpha = 20.0 \times 10^{-4}/\text{deg}$

DYNAMIC PRESSURE GAS BEARING STRUCTURE

BACKGROUND OF THE INVENTION

1. Field of the Invention

The present invention generally relates to a dynamic pressure gas bearing structure, and more specifically, it relates to a dynamic pressure gas bearing structure for supporting a rotor which is rotated at a high speed.

2. Description of the Background Art

Following improvement in storage capacity and reduction in access time of a rotation driving part of a magnetic recording apparatus such as a hard disk driver (hereinafter referred to as "HDD"), for example, a high rotational speed and high rotational accuracy which are responsive thereto are required for a driving spindle motor of the HDD in recent years. In order to rotate such a precision motor requiring a high rotational speed and high rotational accuracy at a higher speed, employment of an air bearing (dynamic pressure gas bearing) for the rotation driving part has been proposed. In such a rotation driving part employing the air bearing, air is forcibly introduced into at least a gap between a radial gas bearing body and a rotor upon rotation of the rotor. Thus, air pressure is increased in the gap to rotate the rotor at a high speed. Thus, maintenance of the rotational accuracy is expected also during high-speed rotation, due to the employment of the air bearing.

In the aforementioned radial gas bearing, a wedge-shaped clearance is defined by eccentricity of a shaft body in the bearing body, as described in "Gas Bearing" by Shinichi Tohgo, Kyoritsu Shuppan (1984), for example. Air passing through the wedge-shaped clearance is compressed to generate pressure. Thus, the shaft body and the bearing body can be supported in a non-contact manner. According to "About Whirling of Gas Bearing" by Atsunobu Mori, "Junkatsu" Vol. 20, No. 7 (1975), pp. 481 to 488, however, a cylindrical journal bearing which is brought into an unloaded state in case of supporting a vertical shaft or the like presents an instable phenomenon called "whirling". In this phenomenon, the shaft is pressed against the bearing surface by centrifugal force to whirl in the interior of the bearing at any rotational speed. In the cylindrical journal bearing, the bearing center deviates from the rotation center due to a static load to generate pressure in a single portion, thereby bringing stable rotation. When the cylindrical journal bearing is applied to a vertical structure of supporting a vertical shaft or the like, the bearing is brought into an unloaded state and hence the pressure generating part is changed by disturbance, to instabilize the rotation.

When the aforementioned dynamic pressure gas bearing is applied to the HDD, the aforementioned factor of instability must be eliminated in consideration of positional accuracy of the rotor which is regarded as important.

SUMMARY OF THE INVENTION

Accordingly, an object of the present invention is to provide a dynamic pressure gas bearing structure which can maintain high rotational accuracy in high-speed rotation.

The dynamic pressure gas bearing structure according to the present invention comprises a columnar shaft body, and a hollow cylindrical bearing body which is opposed to the shaft body with a clearance in the radial direction. When the shaft body and the bearing body are so arranged that central axes thereof are aligned with each other, a substantially cylindrical gap is defined between the outer peripheral surface of the shaft body and the inner peripheral surface of the bearing body. In a cross section which is perpendicular to the axes of the shaft body and the bearing body, the thickness (h) of the gap is defined by the distance between points where a radial straight line passing through the central axes intersects with outlines corresponding to the outer peripheral surface of the shaft body and the inner peripheral surface of the bearing body respectively.

The gap defined in the aforementioned manner has at least one gap change portion. In this gap change portion, the thickness of the gap is varied with respect to a central angle corresponding to the circumference along the outer peripheral surface of the shaft body. Assuming that $D_1$ represents the diameter of the shaft body, $_\Delta h$ represents the amount of change of the gap thickness and $_\Delta \theta$ represents the amount of change of the central angle, a gap change rate $\alpha$ is expressed as follows:

$$\alpha = (_\Delta h / D_1) / _\Delta \theta \, [/°]$$

The gap change portion has a gap change rate in the following range:

$$1.0 \times 10^{-4} \leq \alpha < 10.0 \times 10^{-4}$$

Preferably, the gap comprises a constant gap portion having a substantially constant thickness, and an enlarged gap portion having a thickness which is larger than the constant thickness. The enlarged gap portion includes the gap change portion.

Preferably, the difference $(h_{max} - h_0)D_1$ between the thickness $(h_0)$ of the constant gap portion and the maximum thickness $(h_{max})$ of the enlarged gap portion which is expressed in the ratio to the diameter $(D_1)$ of the shaft body is not more than 0.007.

More preferably, the enlarged gap portion has a width (W) corresponding to a central angle of at least 5°.

The thickness $(h_0/D_1)$ of the constant gap portion which is expressed in the ratio to the diameter $(D_1)$ of the shaft body is preferably not more than 0.00125.

At least one of the shaft body and the bearing body is made to have an incomplete round cross sectional form, thereby defining the enlarged gap portion.

At least three such enlarged gap portions are preferably arranged along the outer peripheral surface of the shaft body.

The cross section of the shaft body may have level difference of not more than $3 \times 10^{-4}$ with respect to the mean diameter $(D_{1m})$ of the shaft body. Further, the cross section of the bearing body may have level difference of not more than $3 \times 10^{-4}$ with respect to the mean inner diameter $(D_{2m})$ of the bearing body.

According to the present invention, the gap change portion having a prescribed gap change rate is defined between the outer peripheral surface of the shaft body and the inner peripheral surface of the bearing body when the shaft body and the bearing body are so arranged that the central axes thereof are aligned with each other. Thus, a wedge-shaped clearance can be defined without making the shaft body eccentric in the interior of the bearing body. When air or lubricating oil flows through the gap which is defined by the shaft body and the bearing body, therefore, dynamic pressure is generated by a wedge effect.

In more concrete terms, a passage for a fluid is enlarged in an extended portion of the gap change portion as shown in the lower half of FIG. 1 illustrating a part A in detail, whereby density of a flow line per unit sectional area is reduced. Consequently, a negative pressure portion is formed. In a reduced portion of the gap change portion, on the other hand, the flow line density per unit sectional area is increased and hence the pressure is increased. Thus, a radial load is supported by the pressure generated in this manner.

In order to efficiently attain such pressure change, the gap change rate α must be within the range of at least $1.0\times10^{-4}/°$ and less than $10.0\times10^{-4}/°$. If the gap change rate is out of the aforementioned range, the shape effect of the gap change portion is so insufficiently attained that pressure increase caused by entrainment of the fluid having viscosity is insufficient.

The difference ($h_{max}-h_0$) between the thickness ($h_0$) of the constant gap portion and the maximum thickness ($h_{max}$) of the enlarged gap portion, i.e., the maximum depth (d) of the enlarged gap portion, is preferably at least 0.00025 and not more than 0.007 with respect to the diameter ($D_1$) of the shaft body. If the maximum depth of the enlarged gap portion exceeds the upper limit, no dynamic pressure action can be attained by a wedge effect due to no action of the shape effect of the wall surface of the enlarged gap portion. The lower limit of the maximum depth (d) of the enlarged gap portion depends on accuracy which is required in practice.

The enlarged gap portion preferably has a width (W) corresponding to a central angle of at least 5°. This is conceivably because the flow of the fluid is insufficiently developed with respect to the form change of the gap and no desired effect can be attained if the width (W) is less than 5°. While the upper limit of the width (W) is decided by the number of enlarged gap portions which are arranged on the outer peripheral surface of the shaft body, the rate occupied by the enlarged gap portions is preferably not more than ½ with respect to the circumference of the cross section of the shaft body. This is conceivably because the volume of the fluid flowing between the shaft body and the bearing body is increased and hence efficiency of dynamic pressure generation is reduced when the number of enlarged gap portions having large thicknesses is increased with respect to the constant gap portion.

The thickness ($h_0$) of the constant gap portion is preferably not more than 0.00125 in the ratio to the diameter ($D_1$) of the shaft body. In other words, the difference ($D_2-D_1$) between the diameter ($D_1$) of the shaft body and the inner diameter ($D_2$) of the bearing body is preferably not more than 0.0025 with respect to the diameter ($D_1$) of the shaft body. A conceivable reason for this is that the shape effect of the gap so insufficiently acts that no dynamic pressure generating effect of the wedge-shaped clearance is functional if the thickness of the constant gap portion is increased, similarly to the action by the maximum depth of the enlarged gap portion.

The enlarged gap portion is obtained by making at least one of the outer peripheral surface of the shaft body and the inner peripheral surface of the bearing body have an incomplete round cross sectional form. The cross sectional forms of the shaft body and the bearing body can be decided by the form of the gap defined in the aforementioned manner.

When the present invention is applied to an actual bearing structure, dynamic balance must be attained in at least two positions, due to the necessity for supporting a radial load. In more concrete terms, the aforementioned enlarged gap portions must be arranged in two positions along the outer peripheral surface of the shaft body. If the enlarged gap portions are provided only in two positions, however, dynamic fluctuation may readily take place with respect to disturbance which is perpendicular to the direction of balance. More preferably, therefore, dynamic balance is attained in at least three positions by arranging the enlarged gap portions in at least three positions along the outer peripheral surface of the shaft body.

In order to further efficiently attain pressure increase, the gap change rates of the extended and reduced portions preferably differ from each other in the gap change portion. In the extended portion accompanied with pressure reduction, the pressure is preferably gradually reduced, to minimize loss of the flow. In the reduced portion, on the other hand, it is conceivably effective to abruptly increase the pressure, thereby suppressing loss of fluid energy caused by friction on the wall surface. Also when the gap change rates of the extended and reduced portions differ from each other, these gap change rates must be within the aforementioned range.

When the cross section of the shaft body has level difference (δ) of not more than $3\times10^{-4}$ with respect to the mean diameter ($D_{1m}$) of the shaft body or the cross section of the bearing body has level difference of not more than $3\times10^{-4}$ with respect to the mean inner diameter ($D_{2m}$) of the bearing body, stability of rotation is maintained due to the gap change rate(s) within the aforementioned range. This is conceivably because the gap change portion is highly effective on irregularity of the shaft body or the bearing body.

The dynamic pressure gas bearing structure according to the present invention can attain excellent rotational accuracy also when the same is applied to a transverse structure, i.e., a bearing structure for supporting a horizontal shaft. Also when the shaft body is eccentric in the bearing body by a static load in the transverse structure, pressure is generated by the inventive gap change portion in addition to the wedge-shaped clearance which is defined between the shaft body and the bearing body, due to the eccentricity. It is therefore conceivable that stability of rotation is increased also in the transverse structure due to a functional effect which is similar to that in the vertical structure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EXAMPLE 1

The inventors have logically simulated influence which is exerted on generated dynamic pressure by the form of a gap defined between a shaft body and a bearing body by numerical analysis.

Figure 1:
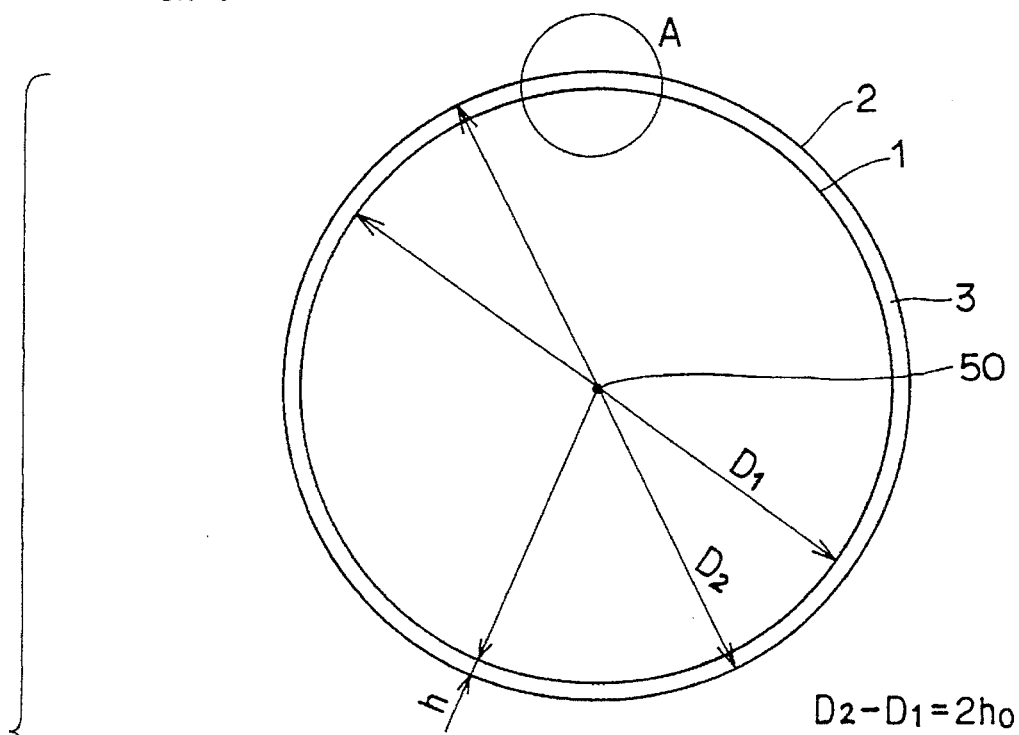
FIG. 1 is a cross sectional view showing the inner peripheral surface of a shaft body and the inner peripheral surface of a bearing body which are employed for defining a gap according to the present invention.
Figure 1:
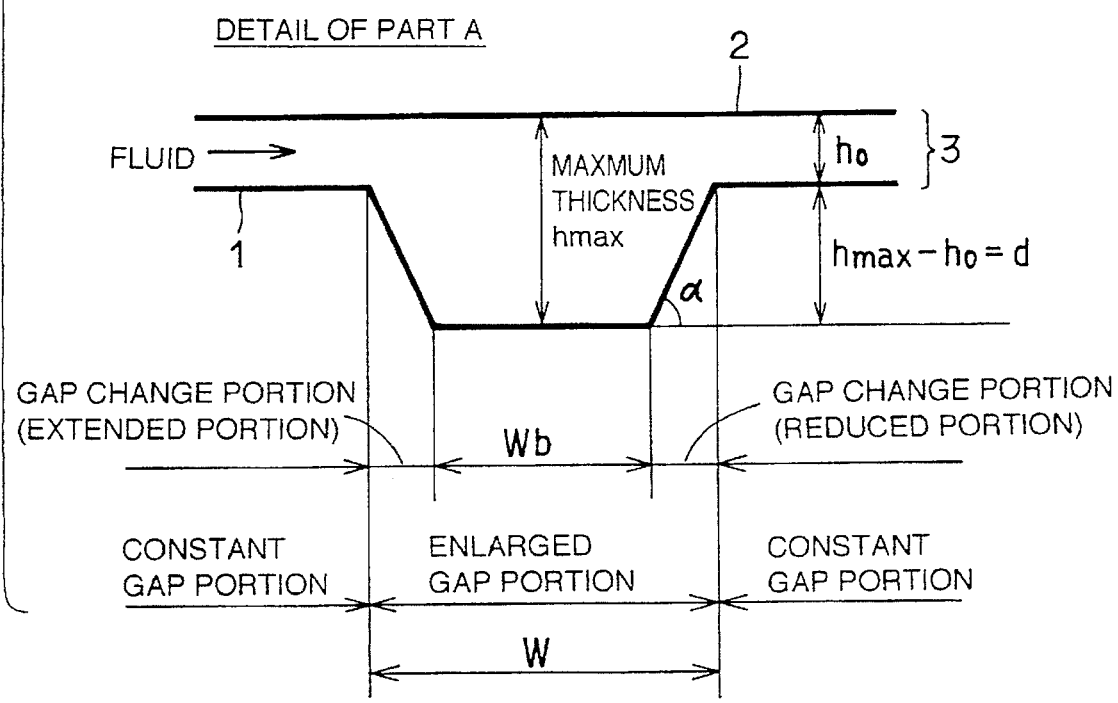

FIG. 1 is a cross sectional view showing the outer peripheral surface of a shaft body 1 and the inner peripheral surface of a bearing body 2 which are employed for defining the form of a gap 3 in a dynamic pressure gas bearing structure according to the present invention. As shown in FIG. 1, the gap 3 is defined between the outer peripheral surface of the shaft body 1 and the inner peripheral surface of the bearing body 2. The shaft body 1 has a diameter $D_1$. The bearing body 2 has an inner diameter $D_2$. The thickness of the gap 3 is expressed as h.

As shown in the lower half of FIG. 1 illustrating a part A in detail, an enlarged gap portion and a constant gap portion are defined. The enlarged gap portion includes a gap change portion. The enlarged gap portion has a width W, which is expressed in a central angle corresponding to the circumference which is the cross sectional form of the shaft body 1. The enlarged gap portion has a base width Wb. The gap change portion has extended and reduced portions. The thickness of the constant gap portion is expressed as $h_0$. The maximum thickness of the enlarged gap portion is expressed as $h_{max}$. The thickness $h_0$ of the constant gap portion is ½ the difference (diameter difference) between the diameter $D_1$ of the shaft body 1 and the inner diameter $D_2$ of the bearing body 2. The maximum depth d of the enlarged gap portion is expressed in the difference between the maximum thickness $h_{max}$ of the enlarged gap portion and the thickness $h_0$ of the constant gap portion. The gap change rate is expressed in inclination $\alpha$. The form of the gap 3 defined as the above is set when the shaft body 1 and the bearing body 2 are so arranged that central axes 50 thereof are aligned with each other.

Figure 2:
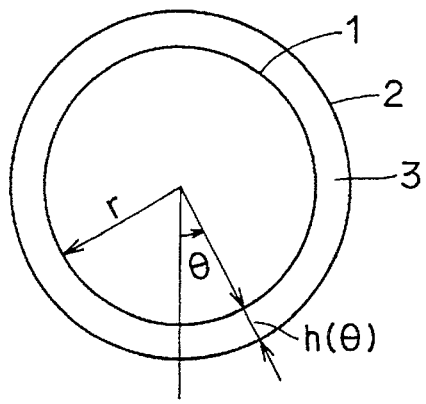
FIG. 2 illustrates the outer peripheral surface of the shaft body and the inner peripheral surface of the bearing body as models of simulation calculation of a dynamic pressure gas bearing structure according to the present invention.

FIG. 2 is a cross sectional view showing the outer peripheral surface of the shaft body 1 and the inner peripheral surface of the bearing body 2 for defining a form function and a gap function of the radial bearing structure shown in FIG. 1. The gap 3 shown in FIG. 2 is defined by a gap function $h_{(\theta)}$. The form of the outer peripheral surface of the shaft body 1 is defined by a form function $g(\theta)$. Forms of gaps defined by functions in the aforementioned manner were varied to obtain values of dynamic pressure generated in rotation by numerical calculation.

The numerical calculation was performed under the following assumption:

(i) The fluid (air in this case) was an incompressible fluid in laminar flow.

(ii) In relation to a gap function $h(\theta)$ with respect to the circumferential direction, the fluid satisfied the following equation:

$$\frac{\partial}{\partial \chi}\left(\frac{\rho h^3}{\mu}\frac{\partial p}{\partial \chi}\right)+\frac{\partial}{\partial y}\left(\frac{\rho h^3}{\mu}\frac{\partial p}{\partial y}\right)= \qquad (1)$$

$$6\left\{U\frac{\partial}{\partial \chi}(\rho h)+2\frac{\partial}{\partial y}(\rho h)\right\}$$

where, p: pressure,

μ: viscocity coefficient of air,

ρ: density of air

U: rotational speed of bearing, h: gap function

As shown in FIG. 2, the gap function $h(\theta)$ was substituted in the equation (1) in correspondence to each circumferential position in the outer peripheral surface of the shaft body 1 which was defined by the central angle θ, thereby obtaining pressure generated in each circumferential position.

(1) Influence Exerted on Dynamic Pressure by Gap

CHANGE RATE

Figure 3:
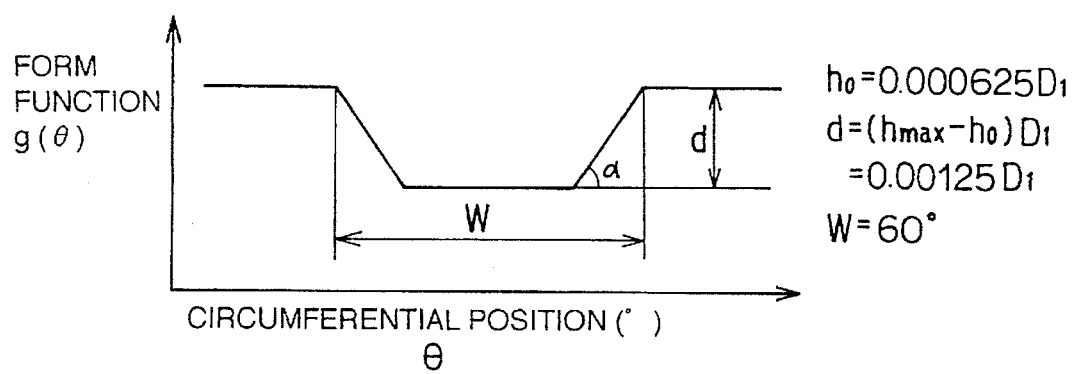
FIG. 3 illustrates a form function employed for studying influence exerted on dynamic pressure by a gap change rate.

The thickness $h_0$ of the constant gap portion was set in the ratio of 0.000625 to the diameter $D_i$ (in the ratio of 0.00125 of the difference between the diameter $D_1$ of the shaft body 1 and the inner diameter $D_2$ of the bearing body 2 to the diameter $D_1$), and the maximum depth d of the enlarged gap portion was set at 0.00125 in the ratio to the diameter $D_1$. The width W of the enlarged gap portion was set at a central angle of 60°. At this time, the shaft body 1 and the bearing body 2 were coaxially arranged, and the maximum pressure generated upon rotation of the shaft body 2 at 20,000 rpm was obtained by numeric calculation, to study influence exerted on the dynamic pressure by the gap change rate. The form function $g(\theta)$ was defined as shown in FIG. 3, and only the gap change rate α was varied.

Consequently, it has been recognized that pressure increase of at least $0.1 \times 10^5$ Pa is attained in the range of the gap change rate α of at least $1.0 \times 10^{-4}/°$ and less than $10.0 \times 10^{-4}/°$, while pressure difference with respect to the atmospheric pressure is zero when the shaft body is in the form of a complete round, as shown in Table 1. Thus, it has been recognized that dynamic pressure is generated in the inventive radial bearing structure also when the shaft body and the bearing body are coaxially arranged, whereby a bearing structure exhibiting high rotational accuracy also in high-speed rotation can be provided.

TABLE 1

| Gap Change Rate α ($\times 10^{-4}/°$) | Pressure Difference with respect to Atmospheric Pressure ($\times 10^5$ Pa) |
|---|---|
| *complete round | 0 |
| *0.5 | 0.05 |
| 1.0 | 0.11 |

TABLE 1-continued

| Gap Change Rate $\alpha$ ($\times 10^{-4}/°$) | Pressure Difference with respect to Atmospheric Pressure ($\times 10^5$ Pa) |
| --- | --- |
| 3.0 | 0.18 |
| 5.0 | 0.12 |
| *10.0 | 0.03 |
| *15.0 | 0 |

Figure 4:
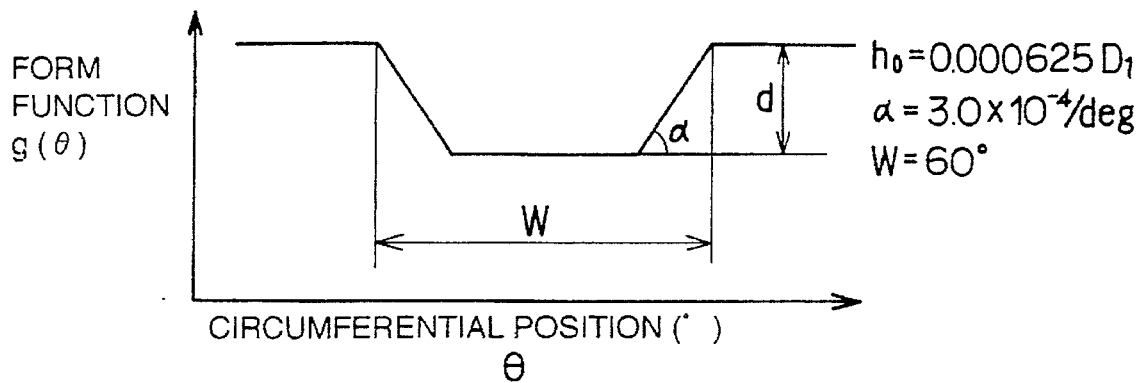
FIG. 4 illustrates a form function employed for studying influence exerted on dynamic pressure by the maximum depth of a enlarged gap portion.

*: comparative example (2) Influence Exerted on Dynamic Pressure by Maximum Depth of Enlarged Gap Portion As to the radial bearing structure comprising the gap change portion having the gap change rate obtaining generation of excellent dynamic pressure in the above item (1), only the maximum depth d of the enlarged gap portion was varied to calculate generated pressure. Namely, the form function $g(\theta)$ was defined as shown in FIG. 4, and only the maximum depth d was varied.

Table 2 shows change of the generated dynamic pressure with respect to the maximum depth d of the enlarged gap portion expressed in the ratio to the diameter $D_1$.

TABLE 2

| d/D1 | 0.000375 | 0.000625 | 0.000875 | 0.00125 | 0.0025 | 0.00625 | *0.0125 |
| --- | --- | --- | --- | --- | --- | --- | --- |
| Pressure Difference with respect to Atmospheric Pressure ($\times 10^5$ Pa) | 0.23 | 0.21 | 0.20 | 0.18 | 0.10 | 0.02 | 0 |

*comparative example

When the ratio $d/D_1$ of the maximum depth of the enlarged gap portion to the diameter of the shaft body is not more than 0.007, at least dynamic pressure which is necessary for supporting a bearing body rotated at a high speed is obtained. Thus, it is inferable that a dynamic pressure gas bearing structure having small fluctuation following high-speed rotation can be obtained.

(3) Influence Exerted on Dynamic Pressure by Width of Enlarged Gap Portion

Figure 5:
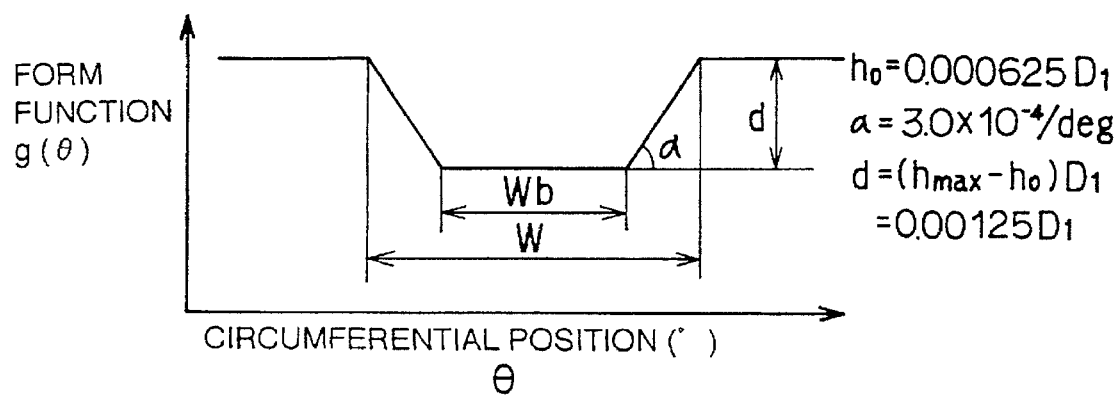
FIG. 5 illustrates a form function employed for studying influence exerted on dynamic pressure by the width of the enlarged gap portion.

In a radial bearing structure having a form function $g(\theta)$ shown in FIG. 5, pressure generated when only the width W of the enlarged gap portion was varied was calculated. Table 3 shows the results. The calculation was made on enlarged gap portions including only gap change portions (Wb_0) and those having bottom portions (Wb>0) respectively.

TABLE 3

| | W | | | | |
| --- | --- | --- | --- | --- | --- |
| | 8° | 10° | 30° | 60° | 90° |
| Pressure Difference with respect to Atmospheric Pressure ($\times 10^5$ Pa) Form 1 (Wb = 0) | 0.03 | — | — | — | — |
| Form 2 (Wb > 0) | — | 0.05 | 0.18 | 0.35 | 0.06 |

As shown in Table 3, it is inferable that pressure difference with respect to the atmospheric pressure is increased as the width W of the enlarged gap portion is increased, and hence a dynamic pressure gas bearing structure having smaller fluctuation in high-speed rotation can be obtained.

(4) Influence Exerted on Dynamic Pressure by Thickness of Constant Gap Portion

Figure 6:
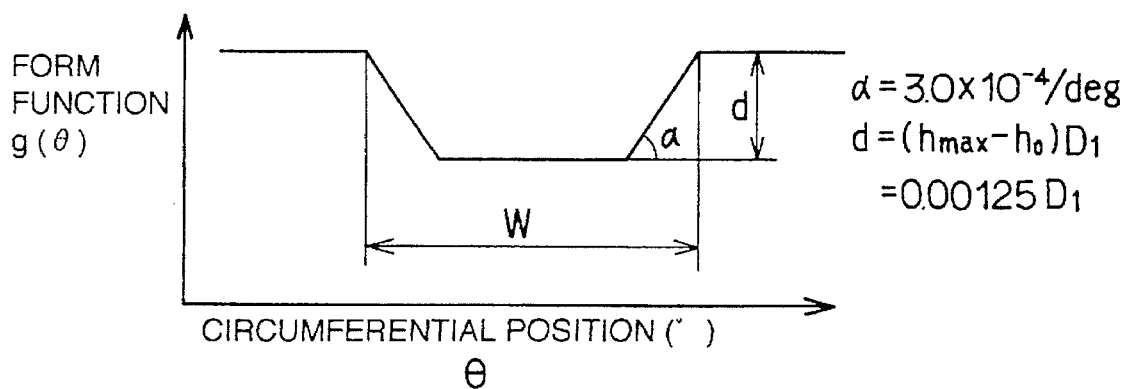
FIG. 6 illustrates a form function employed for studying influence exerted on dynamic pressure by the thickness (diameter difference) of a constant gap portion.

In a radial bearing structure having a form function $g(\theta)$ shown in FIG. 6, pressure generated when only the thickness $h_0$ of the constant gap portion (difference $2h_0$ between the diameter $D_1$ of the shaft body and the inner diameter $D_2$ of the bearing body) was calculated. Table 4 shows the results.

TABLE 4

| Diameter Difference 2 ho/DI | 0.000375 | 0.000625 | 0.000875 | 0.00125 | 0.0025 | *0.00625 | *0.0125 |
| --- | --- | --- | --- | --- | --- | --- | --- |
| Pressure Difference with respect to Atmospheric Pressure ($\times 10^5$ Pa) | 0.39 | 0.36 | 0.25 | 0.18 | 0.06 | 0 | 0 |

*comparative example

As shown in Table 4, dynamic pressure is generated when the diameter difference $2h_0$ is not more than 0.0025 in the ratio to the diameter $D_1$. Therefore, it is inferable that a dynamic pressure gas bearing structure having high rotational accuracy with small fluctuation in high-speed rotation can be obtained when the diameter difference is within the above range.

EXAMPLE 2

On the basis of the aforementioned simulation results, radial bearing structures were prepared in practice as to those attaining excellent effects of dynamic pressure generation, and subjected to measurement of rotational accuracy. The gap change rate $\alpha$ was set at $3.0 \times 10^{-4}$/deg.

Figure 7:
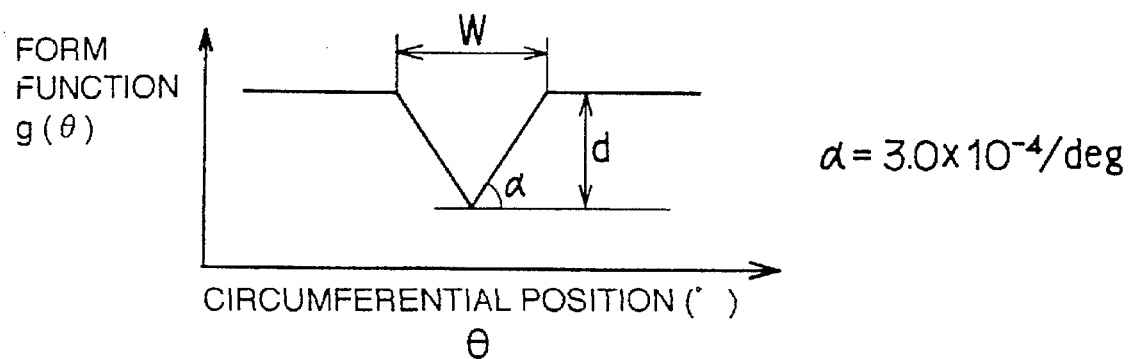
FIG. 7 illustrates a form function employed in Example 2.
Figure 8:
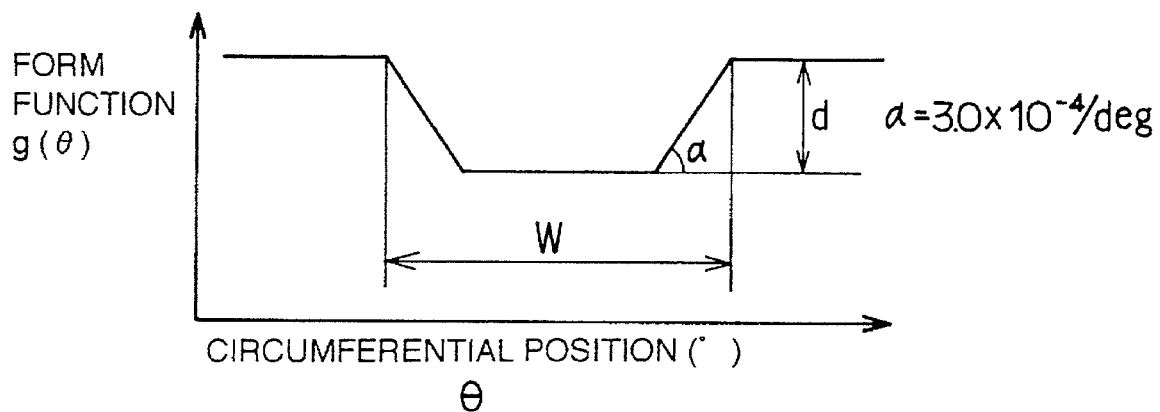
FIG. 8 illustrates another form function employed in Example 2.

Form functions g(θ) shown in FIGS. 7 and 8 were employed. In actual preparation, shaft bodies having complete round cross sectional forms were machined to obtain the target form functions.

Figure 9:
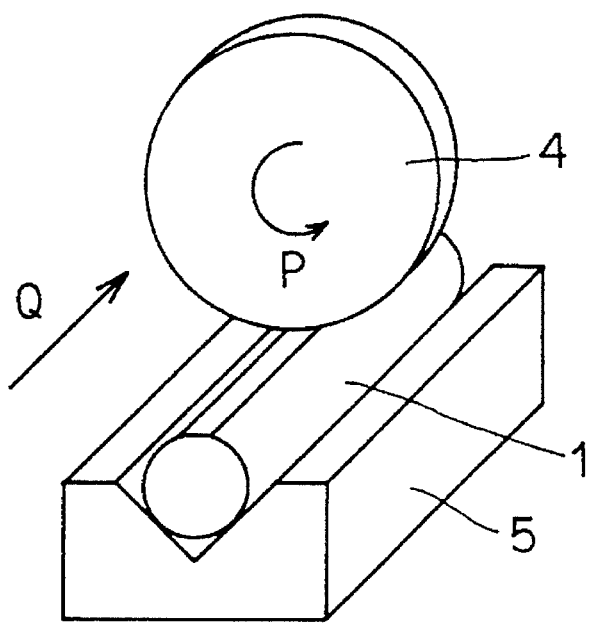
FIG. 9 is a perspective view showing an exemplary method of working a shaft body.

In more concrete terms, the shaft bodies were worked in the following manner:

The form function shown in FIG. 7 was obtained by placing a shaft body 1 on a V block 5 and rotating a grinding stone 4 along arrow P while moving the shaft body 1 along arrow Q for grinding the same, as shown in FIG. 9.

Figure 10:
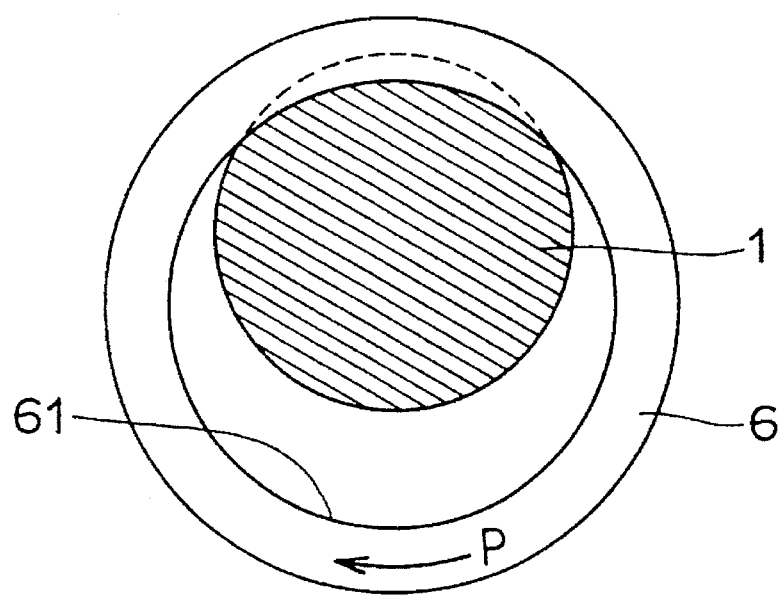
FIG. 10 is a perspective view showing another exemplary method of working a shaft body.

A shaft body 1 comprising the form function shown in FIG. 8 was worked by employing the inner peripheral surface of an annular grindstone 6 as a grinding face 61 and rotating the grindstone 6 along arrow P while grinding the outer peripheral surface of the shaft body 1 as shown by a broken line in FIG. 10.

Figure 11:
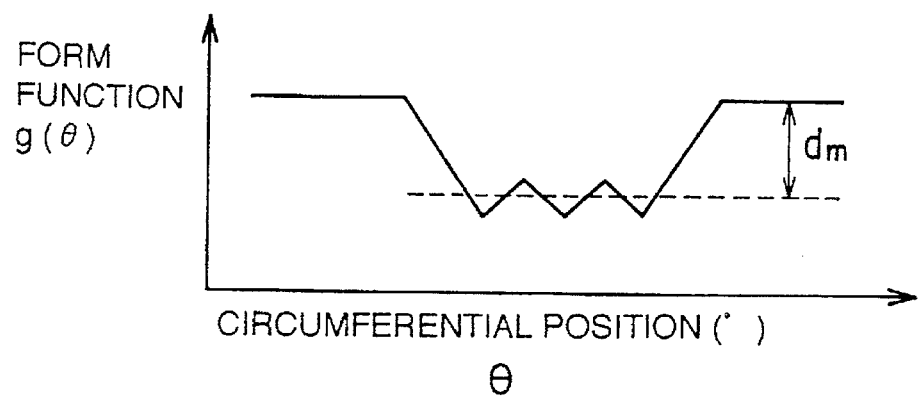
FIG. 11 illustrates still another form function employed in Example 2.

Another shaft body 1 comprising the form function of FIG. 8 was worked in a method different from the above. After the grinding shown in FIG. 9 was completed, the shaft body 1 was slightly rotated and subjected to the grinding shown in FIG. 9 again, and this working was repeated until the worked portion reached a prescribed width. According to this working method, irregularity is formed in the bottom portion defining the maximum thickness of the enlarged gap portion in the actual form function, as shown in FIG. 11. When the mean depth $d_m$ is employed as the maximum depth of the enlarged gap portion as shown in FIG. 11, the shaft body can be regarded as comprising a form function which is similar to that of FIG. 8.

Figure 12:
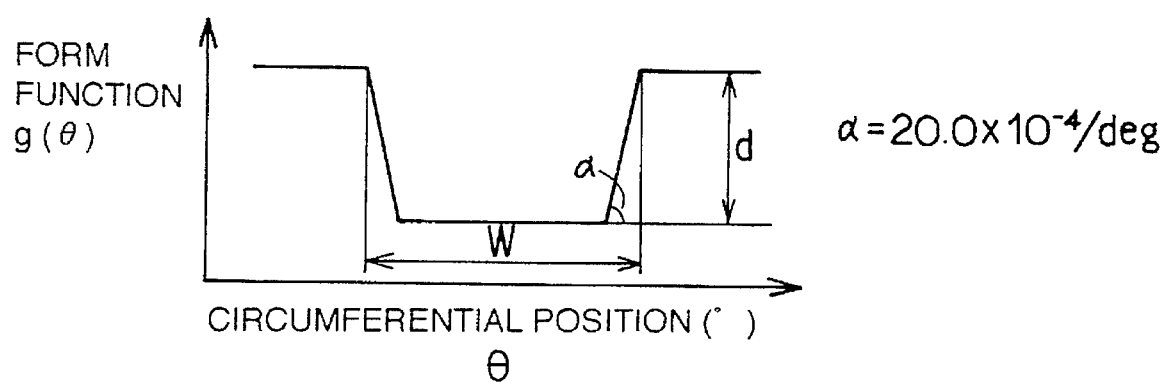
FIG. 12 illustrates a form function employed in comparative example.

As comparative examples, a radial bearing structure provided with a shaft body and a bearing body having complete round cross sectional forms and that employing a shaft body having a form function with a gap change rate α exceeding the inventive scope as shown in FIG. 12 were prepared and subjected to measurement of rotational accuracy.

Figure 13:
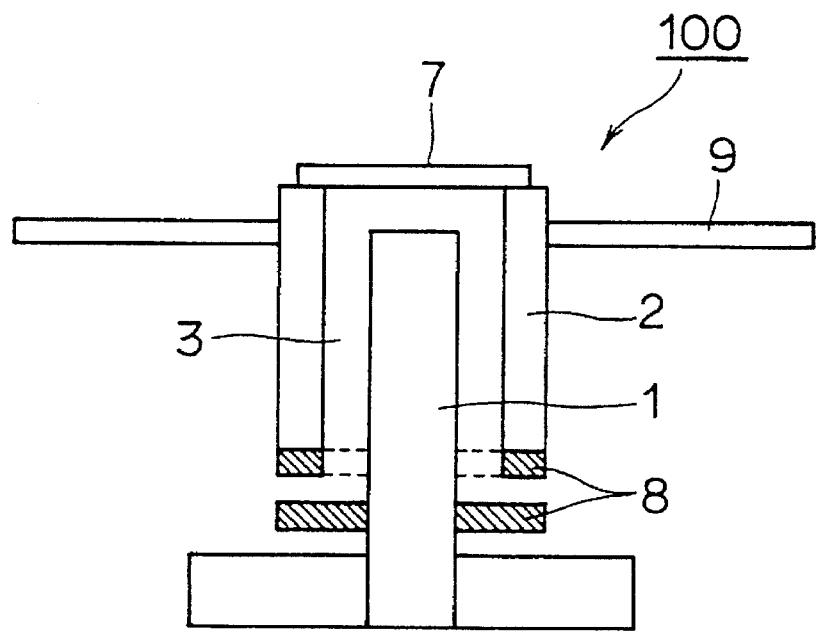
FIG. 13 schematically illustrates the structure of a motor to which the inventive dynamic pressure gas bearing structure is applied.
Figure 14:
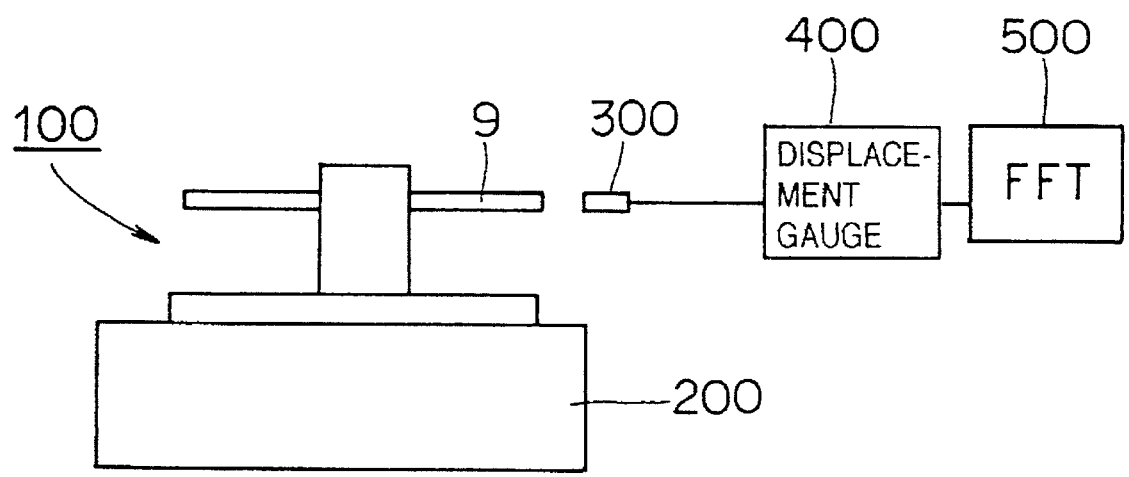
FIG. 14 schematically illustrates an apparatus employed in Example for evaluating stability and rotational accuracy of the inventive dynamic pressure gas bearing structure.

In each of the samples prepared in the aforementioned manner, the shaft body 1 and the bearing body 2 were set as a fixed shaft and a movable body respectively. As shown in FIG. 13, the shaft body 1 and the bearing body 2 were built into a motor 100. A lid 7 and a magnet 8 were provided on and under the bearing body 2 respectively. Another magnet 8 was provided on the outer peripheral surface of the shaft body 1 to be opposed to the magnet 8 provided under the bearing body 2, to attain action of repulsion. Further, an annular disc 9 was provided on the upper outer peripheral surface of the bearing body 2.

The motor 100 having the aforementioned structure was rotated at a high speed by rotating the bearing body 2 with respect to the shaft body 1 at a rotational frequency of 20,000 rpm, and values of vertical and horizontal displacement of the rotated disc 9 were measured with a position sensor 300. The detected amounts of displacement were measured by a displacement gauge 400, and analyzed by an FFT (fast Fourier transformer) 500.

Table 5 shows the results obtained in shaft bodies comprising the form function of FIG. 7. Tables 6 and 7 show the results obtained in shaft bodies comprising the form function shown in FIG. 8, which were worked in the methods shown in FIGS. 10 and 9 respectively. Table 8 shows the results obtained in comparative examples employing the shaft bodies having complete round structures and those comprising the form function of FIG. 12. Referring to Table 8, Nos. 1 to 3 indicate samples of complete round structures.

Referring to Tables 5 to 7, any of the depth $d/D_1$, the width W, the diameter difference $2h_0/D_1$ and the number of enlarged gap portions (number of worked portions) is out of the inventive range in each of comparative examples.

TABLE 5

| No. | Number of Worked Portions | Depth d/DI | Width W (°) | Diameter Difference 2 ho/DI | Whirling Stability | Non-Reproducible Displacement (μm) |
| --- | --- | --- | --- | --- | --- | --- |
| *1 | 2 | 0.00125 | 8 | 0.000625 | instable | 5.1 |
| *2 | 3 | 0.00025 | 4 | 0.000625 | instable | 4.4 |
| 3 | 3 | 0.00125 | 8 | 0.000625 | stable | 0.028 |
| 4 | 3 | 0.00125 | 8 | 0.00125 | stable | 0.072 |
| *5 | 3 | 0.00125 | 8 | 0.003125 | instable | 3.9 |
| 6 | 3 | 0.0025 | 11 | 0.000625 | stable | 0.113 |
| *7 | 3 | 0.01 | 23 | 0.000625 | instable | 2.7 |
| 8 | 6 | 0.00125 | 8 | 0.000625 | stable | 0.041 |

TABLE 6

| No. | Number of Worked Portions | Depth d/DI | Width W (°) | Diameter Difference 2 ho/DI | Whirling Stability | Non-Reproducible Displacement (μm) |
| --- | --- | --- | --- | --- | --- | --- |
| *1 | 2 | 0.00125 | 10 | 0.000625 | instable | 1.5 |
| 2 | 3 | 0.00125 | 10 | 0.000625 | stable | 0.019 |
| 3 | 3 | 0.00125 | 30 | 0.000625 | stable | 0.012 |
| 4 | 3 | 0.00125 | 60 | 0.000625 | stable | 0.008 |
| 5 | 3 | 0.00125 | 90 | 0.000625 | stable | 0.062 |
| 6 | 3 | 0.00125 | 30 | 0.00125 | stable | 0.047 |
| *7 | 3 | 0.00125 | 30 | 0.003125 | instable | 2.3 |
| 8 | 3 | 0.0025 | 30 | 0.000625 | stable | 0.075 |
| *9 | 3 | 0.01 | 30 | 0.000625 | instable | 1.8 |
| 10 | 6 | 0.00125 | 30 | 0.000625 | stable | 0.022 |

*: comparative example

TABLE 7

| No. | Number of Worked Portions | Depth d/DI | Width W (°) | Diameter Difference 2 ho/DI | Whirling Stability | Non-Reproducible Displacement (μm) |
| --- | --- | --- | --- | --- | --- | --- |
| *1 | 2 | 0.00125 | 10 | 0.000625 | instable | 1.6 |
| 2 | 3 | 0.00125 | 10 | 0.000625 | stable | 0.035 |
| 3 | 3 | 0.00125 | 30 | 0.000625 | stable | 0.029 |
| 4 | 3 | 0.00125 | 60 | 0.000625 | stable | 0.018 |
| 5 | 3 | 0.00125 | 90 | 0.000625 | stable | 0.094 |
| 6 | 3 | 0.00125 | 30 | 0.00125 | stable | 0.063 |
| *7 | 3 | 0.00125 | 30 | 0.003125 | instable | 3.4 |
| 8 | 3 | 0.0025 | 30 | 0.000625 | stable | 0.121 |
| *9 | 3 | 0.01 | 30 | 0.000625 | instable | 2.9 |
| 10 | 6 | 0.00125 | 30 | 0.000625 | stable | 0.031 |

*: comparative example

TABLE 8

| No. | Number of Worked Portions | Depth d/DI | Width W (°) | Diameter Difference 2 ho/DI | Whirling Stability | Non-Reproducible Displacement (μm) |
| --- | --- | --- | --- | --- | --- | --- |
| *1 | — | — | — | 0.000625 | instable | 4.2 |
| *2 | — | — | — | 0.00125 | instable | 5.3 |
| *3 | — | — | — | 0.001875 | instable | 6.2 |
| *4 | 3 | 10 | 10 | 0.00625 | instable | 3.7 |
| *5 | 3 | 10 | 30 | 0.00625 | instable | 2.4 |
| *6 | 3 | 10 | 60 | 0.00625 | instable | 1.8 |

*: comparative example

As clearly understood from the above results, no vibration displacement specific to a whirling phenomenon of a rotor, i.e., no vibration displacement corresponding to about ½ the rotational frequency, was recognized in the inventive samples. Further, it was possible to suppress non-reproducible displacement to less than 1 μm.

In comparative examples, on the other hand, it was impossible to attain sufficient dynamic pressure for supporting a rotor with no eccentricity. Consequently, instable behavior was conceivably caused by unbalance due to eccentricity. Further, this instable behavior conceivably increased non-reproducible displacement, to exhibit large non-reproducible displacement exceeding 1 μm.

In the inventive samples, those having shaft bodies comprising the form function of FIG. 8 exhibited relatively small values of non-reproducible displacement and excellent rotational accuracy.

EXAMPLE 3

Figure 15:
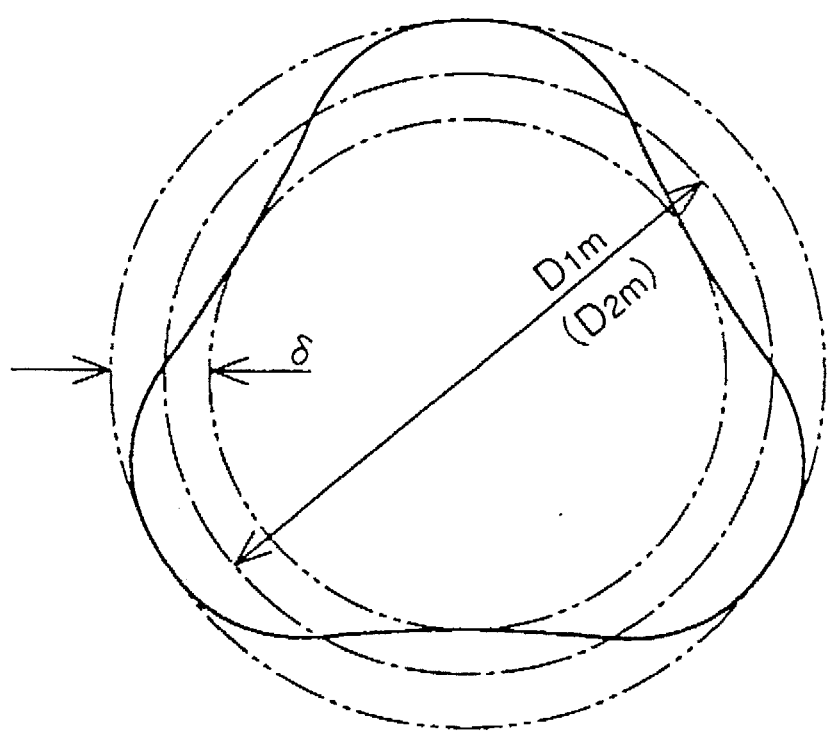
FIG. 15 is a cross sectional view for defining level difference between the outer peripheral surface of a shaft body and the inner peripheral of a bearing body employed in Example 3.

A shaft body and a bearing body each having an irregular cross sectional form shown in FIG. 15 were employed and subjected to measurement of whirling stability and non-reproducible displacement, similarly to Example 2.

FIG. 15 is a cross sectional view showing the outer peripheral surface of the shaft body or the inner peripheral surface of the bearing body. Referring to FIG. 15, the solid line indicates the outer peripheral surface of the shaft body or the inner peripheral surface of the bearing body. Symbol $D_{1m}$ denotes the mean diameter of the shaft body, and symbol $D_{2m}$ denotes the mean inner diameter of the bearing body. The one-dot chain line shows a circle having the mean diameter or the mean inner diameter. Two circles shown by two-dot chain lines are virtual circumscribed and inscribed circles which are in contact with the outer peripheral surface of the shaft body or the inner peripheral surface of the bearing body respectively. Level difference δ is defined as the distance between the circumscribed and inscribed circles in the radial direction.

Shaft bodies and bearing bodies were prepared to have the form function shown in FIG. 8, with a gap change rate α of $3.0 \times 10^{-4}$/deg, depth $d/D_{1m}=0.00125$, width W=10° and diameter difference $2h_0/D_{1m}=0.000625$. Combinations of the ratios ($\delta/D_{1m}$) of the level difference (δ) to the mean diameters ($D_{1m}$) of the shaft bodies and the ratios of the level difference (δ) to the mean inner diameters ($D_{2m}$) of the bearing bodies were set as shown in Tables 9 and 10. As to these combinations of the shaft bodies and the bearing bodies, whirling stability and non-reproducible displacement were measured similarly to Example 2.

As shown in Table 9, it is understood that the whirling stability is stabilized when each of the ratio ($\delta/D_{1m}$) of the level difference of the shaft body to the mean diameter and the ratio ($\delta/D_{2m}$) of the level difference of the bearing body to the mean inner diameter is not more than $3 \times 10^{-4}$. As shown in Table 10, small values of nonreproducible displacement and excellent rotational accuracy were exhibited when each of $\delta/D_{1m}$ and $\delta/D_{2m}$ was not more than $3 \times 10^{-4}$. Thus, it is understood that a bearing structure having excellent rotation characteristics can be obtained when each of the ratio of the level difference of the shaft body to the mean diameter and that of the level difference of the bearing body to the mean inner diameter is not more than $3 \times 10^{-4}$. The bearing structures with a gap defined according to the present application in the inventive samples of Example 2 also exhibited excellent rotation characteristics when the ratio of the level difference is within the above range.

TABLE 9

| | Bearing Body $\delta/D_{2m}$ | | | | | |
|---|---|---|---|---|---|---|
| | $0.15 \times 10^{-4}$ | $0.4 \times 10^{-4}$ | $0.8 \times 10^{-4}$ | $1.25 \times 10^{-4}$ | $2.5 \times 10^{-4}$ | $*3.5 \times 10^{-4}$ |
| Shaft Body $\delta/D_{1m}$ | | | | | | |
| $0.15 \times 10^{-4}$ | stable | stable | stable | stable | stable | instable |
| $0.4 \times 10^{-4}$ | stable | stable | stable | stable | stable | instable |
| $0.8 \times 10^{-4}$ | stable | stable | stable | stable | stable | instable |
| $1.25 \times 10^{-4}$ | stable | stable | stable | stable | stable | instable |
| $2.5 \times 10^{-4}$ | stable | stable | stable | stable | stable | instable |
| $*3.5 \times 10^{-4}$ | instable | instable | instable | instable | instable | instable |

*: comparative example

TABLE 10

| | Bearing Body $\delta/D_{2m}$ | | | | | |
|---|---|---|---|---|---|---|
| | $0.15 \times 10^{-4}$ | $0.4 \times 10^{-4}$ | $0.8 \times 10^{-4}$ | $1.25 \times 10^{-4}$ | $2.5 \times 10^{-4}$ | $*3.5 \times 10^{-4}$ |
| Shaft Body $\delta/D_{1m}$ | | | | | | |
| $0.15 \times 10^{-4}$ | 0.01 | 0.03 | 0.07 | 0.1 | 0.2 | 2.3 |
| $0.4 \times 10^{-4}$ | 0.03 | 0.04 | 0.07 | 0.15 | 0.25 | 2.6 |
| $0.8 \times 10^{-4}$ | 0.07 | 0.08 | 0.12 | 0.21 | 0.28 | 3.1 |
| $1.25 \times 10^{-4}$ | 0.10 | 0.12 | 0.22 | 0.25 | 0.32 | 3.6 |
| $2.5 \times 10^{-4}$ | 0.20 | 0.25 | 0.30 | 0.35 | 0.38 | 4.2 |
| $*3.5 \times 10^{-4}$ | 2.3 | 2.5 | 3.2 | 4.0 | 4.5 | 5.6 | unit: μm
*: comparative example

As hereinabove described, a dynamic pressure gas bearing structure having high rotational accuracy under high-speed rotation can be provided by comprising a gap which is defined according to the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dynamic pressure gas bearing structure comprising a columnar shaft body and a hollow cylindrical bearing body being opposed to said shaft body with a clearance in the radial direction, wherein a substantially cylindrical gap is defined by the outer peripheral surface of said shaft body and the inner peripheral surface of said bearing body when said shaft body and said bearing body are so arranged that central axes thereof are aligned with each other, the thickness (h) of said gap is defined by the distance between points where a radial straight line passing through said central axes intersects with outlines corresponding to the outer peripheral surface of said shaft body and the inner peripheral surface of said bearing body respectively, said gap has at least one gap change portion where its thickness is changed with respect to a central angle corresponding to the circumference along the outer periphery of said shaft body, a gap change rate α is expressed as follows, assuming that $D_1$ represents the diameter of said shaft body, $_{\Delta}h$ represents the amount of change of the thickness of said gap, and $_{\Delta}\theta$ represents the amount of change of said central angle, and $$\alpha = (_{\Delta}h/D_1)/_{\Delta}\theta [/°]$$

said gap change portion has a gap change rate in the following range:

$$1.0 \times 10^{-4} \leq \alpha < 10.0 \times 10^{-4}.$$

2. The dynamic pressure gas bearing structure in accordance with claim 1, wherein said gap comprises a constant gap portion having a substantially constant thickness and an enlarged gap portion having a thickness being larger than said constant thickness, said enlarged gap portion including said gap change portion.

3. The dynamic pressure gas bearing structure in accordance with claim 2, wherein the difference $(h_{max}-h_0)/D_1$ between the thickness $(h_0)$ of said constant gap portion and the maximum thickness $(h_{max})$ of said enlarged gap portion being expressed in the ratio to the diameter $(D_1)$ of said shaft body is not more than 0.007.

4. The dynamic pressure gas bearing structure in accordance with claim 2, wherein said enlarged gap portion has a width (W) corresponding to said central angle of at least 5°.

5. The dynamic pressure gas bearing structure in accordance with claim 2, wherein the thickness $(h_0/D_1)$ of said constant gap portion being expressed in the ratio to the diameter $(D_1)$ of said shaft body is not more than 0.00125.

6. The dynamic pressure gas bearing structure in accordance with claim 2, wherein at least one of said shaft body and said bearing body is made to have an incomplete round cross sectional form, thereby defining said enlarged gap portion.

7. The dynamic pressure gas bearing structure in accordance with claim 2, wherein at least three said enlarged gap portions are arranged along the outer peripheral surface of said shaft body.

8. The dynamic pressure gas bearing structure in accordance with claim 1, wherein the cross section of shaft body has level difference ($\delta$) of not more than $3\times10^{-4}$ with respect to the mean diameter ($D_{1m}$) of said shaft body.

9. The dynamic pressure gas bearing structure in accordance with claim 1, wherein the cross section of said bearing body has level difference (6) of not more than $3\times10^{-4}$ with respect to the mean inner diameter ($D_{2m}$) of said bearing body.

* * * * *